(12) United States Patent
Prasanna

(10) Patent No.: US 6,425,032 B1
(45) Date of Patent: Jul. 23, 2002

(54) BUS CONTROLLER HANDLING A DYNAMICALLY CHANGING MIX OF MULTIPLE NONPRE-EMPTABLE PERIODIC AND APERIODIC DEVICES

(75) Inventor: G. N. Srinivasa Prasanna, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/292,397

(22) Filed: Apr. 15, 1999

(51) Int. Cl.$^7$ ............................................. G06F 13/362
(52) U.S. Cl. ...................... 710/117; 710/116; 710/118
(58) Field of Search ................................. 710/107–118

(56) References Cited

U.S. PATENT DOCUMENTS

| | | | |
|---|---|---|---|
| 4,980,886 A | * 12/1990 | Bernstein | 370/433 |
| 5,280,584 A | 1/1994 | Caesar et al. | |
| 5,291,487 A | * 3/1994 | Sheppard | 370/433 |
| 5,327,428 A | * 7/1994 | As et al. | 370/353 |
| 5,430,732 A | * 7/1995 | Lee et al. | 370/319 |
| 5,506,989 A | 4/1996 | Boldt et al. | |
| 5,526,344 A | * 6/1996 | Diaz et al. | 370/364 |
| 5,621,898 A | 4/1997 | Wooten | |
| 5,754,529 A | * 5/1998 | Heiss | 370/232 |
| 5,758,105 A | 5/1998 | Kelley et al. | |
| 5,761,197 A | * 6/1998 | Takefman | 370/337 |
| 5,953,336 A | * 9/1999 | Moore et al. | 370/395 |
| 5,956,321 A | * 9/1999 | Yao et al. | 370/230 |
| 6,034,960 A | * 3/2000 | Beshai et al. | 370/395 |
| 6,157,978 A | * 12/2000 | Ng et al. | 710/240 |

* cited by examiner

Primary Examiner—Sumati Lefkowitz
(74) Attorney, Agent, or Firm—Dickstein Shapiro Morin & Oshinsky LLP (57) ABSTRACT

The invention concerns an arbitration scheme for permitting access to the bus of a computer. The arbitration scheme has the ability to control and reduce the delay experienced by any device by monitoring the queue length of the device and using information concerning the device, such as device rate, phase, data transfer size and queue length. Specifically, the arbiter prevents periodic accessing devices, such as audio and video samplers, from being delayed or interrupted for long periods of time once they have begun accessing the bus.

65 Claims, 6 Drawing Sheets

BUS CONTROLLER HANDLING A DYNAMICALLY CHANGING MIX OF MULTIPLE NONPRE-EMPTABLE PERIODIC AND APERIODIC DEVICES

BACKGROUND OF THE INVENTION

1. Field of the Invention

This invention relates to a bus controller or arbiter for controlling access to the bus of a computer system.

2. Description of the Related Art

Computers are becoming a more integral part of everyone's lives with each passing day. There is an ever-present demand for more efficient and faster-operating computers. The speed at which a computer operates is partially dependent on the rate at which data can be accessed by the different devices (e.g., disk drives, modems, etc.) attached to the computer.

Every computer includes a bus which serves as a conduit for the transfer of information between the central processing unit (CPU) of the computer and the various peripherals. Typically, the computer also includes a bus controller (often called an arbiter) for controlling which devices may access the bus, and in what order. A typical arbiter assigns priority values to each device depending on the requirements of the device. For instance, an interactive graphics adapter which is receiving video images over a modem or a network will have high priority because it must have access to the bus at all times, or valuable data will be lost. If the graphics adapter must wait to gain access to the CPU, the data which is transmitted during the waiting period may be lost. Such access interruptions can cause the video image being transmitted to appear jerky and unclear. A device such as a disk drive, however, is a relatively low priority device, since the data is stored in a tangible medium and can be re-accessed at any time.

Figure 1:
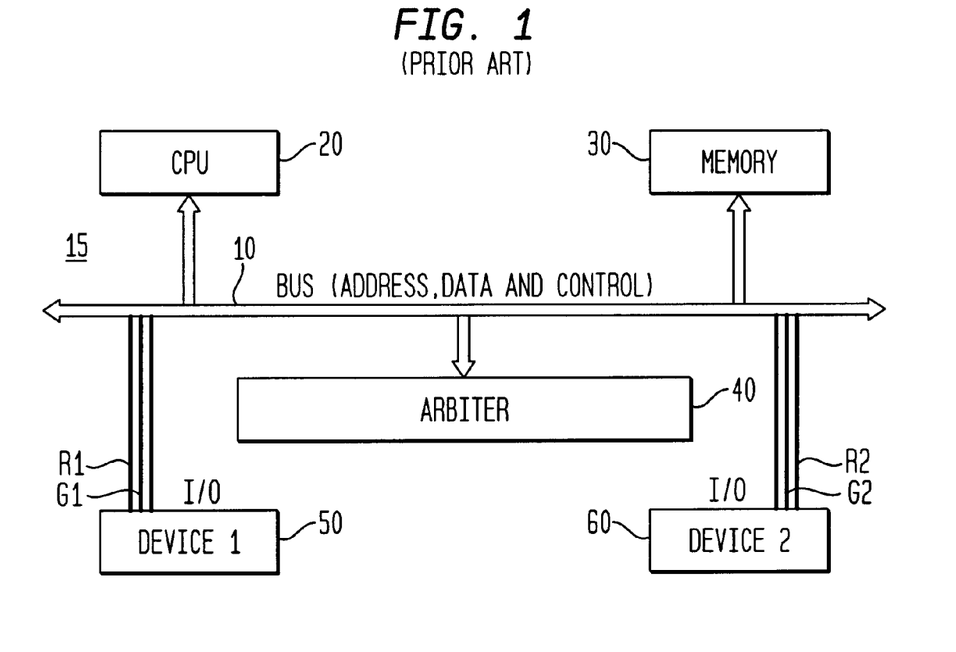
FIG. 1 illustrates a prior art computer bus and arbiter.

FIG. 1 shows an exemplary prior art computer system 15 including a conventional arbiter 40. It should be noted that the computer system 15 is merely one conventional way to implement a computer system with an arbiter, various other system configurations are known to those skilled in the art. A bus 10 having address, data and control information connects a CPU 20 with a memory 30 and the arbiter 40. The bus 10 is also connected to various peripherals 50, 60 (e.g., disk drives, CD-ROM drives, modems, etc.) which are used in conjunction with the computer system 15. In the computer system 15 shown in FIG. 1, there are two peripherals 50, 60 designated as "Device 1" and "Device 2", respectively. Each peripheral 50, 60 includes bus request lines R1, R2, bus grant lines G1, G2, and input/output (I/O) lines connected to the bus 10 destined for the arbiter 40. When a peripheral (e.g., 50) requires access to the bus 10, it sends out a signal on its bus request line (R1) to the arbiter 40 (via the bus 10). The arbiter 40 includes circuitry (not shown) which decides if the request will be granted, and at what time. When the request is granted, the arbiter 40 sends out a "grant" signal, via the bus 10, on the grant line (G1), letting the device (50) known that the bus 10 is ready to transfer or receive its information. The device (50) then transmits or receives the information over its associated I/O line. When transmitting information, the data travels from the device to the bus 10, and then to the information receiver (e.g., CPU 20). When receiving information, the data travels from the transmitter (e.g., CPU 20), over the bus 10 and over the I/O line to the peripheral (in some cases, the CPU 20 itself may act as a peripheral). As stated above, most conventional arbiters assign priorities to each peripheral device based on the arbitration scheme and the general importance of the peripheral. For instance, if "Device 1" (FIG. 2) were a audio sampling device such as a microphone, and "Device 2" were a floppy disk drive, "Device 1" would have a high priority because there is a higher likelihood of data loss. However, most conventional arbiters do not assign different arbitration schemes to periodic requests as opposed to aperiodic (i.e., one time) requests.

Some devices, such as CD-ROM drives, require periodic accessing of the bus. In other words, they need to access the bus many times (e.g., three times) over a specified time period (e.g., 10 $\mu$s). These devices are often referred to as periodic devices. Other examples of periodic devices include: modems and real-time video and audio samplers. The problem encountered with periodic devices is that in the time period between accesses, the bus controller may grant control of the bus to another device because it believes that the periodic device has completed its use of the bus. Therefore, each time the periodic device needs access to the bus it must make another request. Sometimes, if another device has already begun use of the bus, the periodic request may be den i ed by the arbiter, thereby slowing down the accessing process for the periodic device or causing the data transmitted to or from the periodic device to be delayed, queued or lost. The conventional process used for allowing periodic devices access to the computer bus is inefficient because the bus grant/request procedure may need to be repeated numerous times in a short period for the same periodic device.

Kelley et al., in U.S. Pat. No. 5,758,105, describe a method and apparatus for arbitrating periodic and aperiodic requests. The '105 patent describes an arbiter which contains two arbitration algorithms, one for periodic requests and one for aperiodic requests. The arbiter decides whether the device making the bus request is an aperiodic or a periodic device, and executes the proper algorithm accordingly. As can be seen from FIG. 3 of the '105 patent, the arbiter assigns each device connected to the arbiter a certain amount of time on the bus depending upon the requirements of the device. The '105 patent does not describe the periodic bus allocation algorithm, nor does it discuss the effect of arbitrary device rates on the operation of the bus. When rates are arbitrary, no synchronous scheme can guarantee conflict free access to the bus for all devices for an indefinite period of time. Requests of two devices with arbitrary rates (not multiple of each other) will conflict at some time leading to queuing at one or both devices. The queuing of information introduces data delays into the system. The arbiter of the '105 patent does not take into account the queue length of each device trying to gain access to the bus and thus, is sub-optimal.

Accordingly, there is currently a need for bus controller that operates at very high speeds and that dynamically allocates space on a bus between both periodic and aperiodic devices, recognizes periodic devices and grants these devices control of the bus in a manner that minimizes data delays everywhere in the system by estimating queue lengths of the devices (or other performance metrics of interest).

SUMMARY OF THE INVENTION

The present invention is an arbiter which efficiently achieves controlled delays for all devices on the bus, whether periodic or aperiodic. The arbiter divides devices into two categories, periodic and aperiodic. When a request is made the information is relayed to a processor which decides whether to grant or deny the request. A service log located within the arbiter keeps track of important information relating to the requests, such as rate (for periodic requests), data transfer size, device queue length, etc. A time line memory located within the arbiter contains fixed sized entries of bus access service durations for the devices. The arbiter uses the queue length information to determine when a device should be granted access to the bus and uses the time line memory to allocate and grant bus service time to the device. For aperiodic requests, the arbiter consults the time line memory to locate an empty slot to service the request. For periodic requests, the arbiter uses information from the log in conjunction with the time line memory to allocate as many timeslots as it can until it detects a potential conflict (or other criteria are met). The arbiter uses these allocations to issue anticipatory grants to the requesting device. Thus, the arbiter effectively minimizes the queue length and reduces the data delay experienced at each device.

BRIEF DESCRIPTION OF THE DRAWINGS

The above and other advantages and features of the present invention will be better understood from the following detailed description of the preferred embodiments of the invention which is provided in connection with the accompanying drawings.

DETAILED DESCRIPTION OF THE PREFERRED EMBODIMENTS

The present invention is an arbitration system which dynamically allocates timeslots on a data bus so that peripheral devices which require accessing are efficiently prevented from being delayed or denied bus time for long periods of time. In general, the arbiter has to ensure that all devices, whether periodic or aperiodic, experience low delays. Realistically, there is no way to guarantee zero delay for an indefinite period of time when the devices have arbitrary rates. It must be noted, however, that the present invention provides an extremely efficient technique for preventing periodic and aperiodic devices from being delayed or denied bus time for long periods of time. The present invention does so by estimating the queue length of each device requesting access to the bus so that it minimizes and reduces the queue length. Additionally, it is possible for devices having rates that are exact sub-multiples of a higher speed basic rate to obtain service for arbitrary lengths of time with zero delay by eliminating conflicts. For example, if a basic rate is 64 Khz, devices with rates such as 64 Khz, 32 Khz, 16 Khz, 8 Khz, 4 Khz, 2 Khz or 1 Khz all can get service with zero delay for arbitrary lengths of time. Devices with different rates, however, experience non-zero, but low delay.

The arbitration is envisioned as being an integral part of a computer system including a central processing unit (CPU) and a memory. Since the bus must be used by all the computer system components to transfer information, each component must request a timeslot on the bus when it needs to transfer or receive information. When a device must wait for the bus to become free to transfer or receive information, queuing of information occurs and processing speed is decreased. The problem is especially difficult with periodic devices that periodically access the bus over short time spans (e.g., 3 times in 10 $\mu$s) or semi-periodic devices that access the bus in bursts. Each new access in the periodic set must be sent as a separate request to use the bus. Often times, one or more of the set of periodic accesses will be delayed or denied due to other access requests which have come n in-between the periodic requests.

The arbitration system of the present invention estimates the queue lengths of the devices requesting bus access. By allocating bus time based on queue length, the arbiter system of the present invention will reduce queue lengths and minimize data delays throughout the computer system (or optimizes some other criteria). Thus, the arbiter system operates in a manner similar to a telecommunication switch. As will become apparent below, however, the arbiter system does not require complicated hardware or software (typically found in a telecommunications switch), is easy to implement and operates at a very high speed.

In addition, the arbitration system of the present invention allocates a series of timeslots to periodic devices (and with straight-forward extensions, semi-periodic devices) so that they only need to make a single request to use the bus for long periods of required accessing. Preferably, the present invention allows devices having rates that are a sub-multiple of a basic rate to obtain zero-delay (i.e., queueless) service for arbitrary lengths of time without conflict, while allowing periodic devices having periods that are not sub-multiples of the basic rate to obtain service with low delays over large time intervals. Preferably, the present invention will use anticipatory grants based on the multiple allocations to reduce the number of requests issued by periodic devices. The arbitration system of the present invention also operates at a high speed and dynamically allocates and reallocates timeslots for accessing the bus for both aperiodic and periodic devices so that the processing speed of an associated computer system can be increased.

Figure 2:
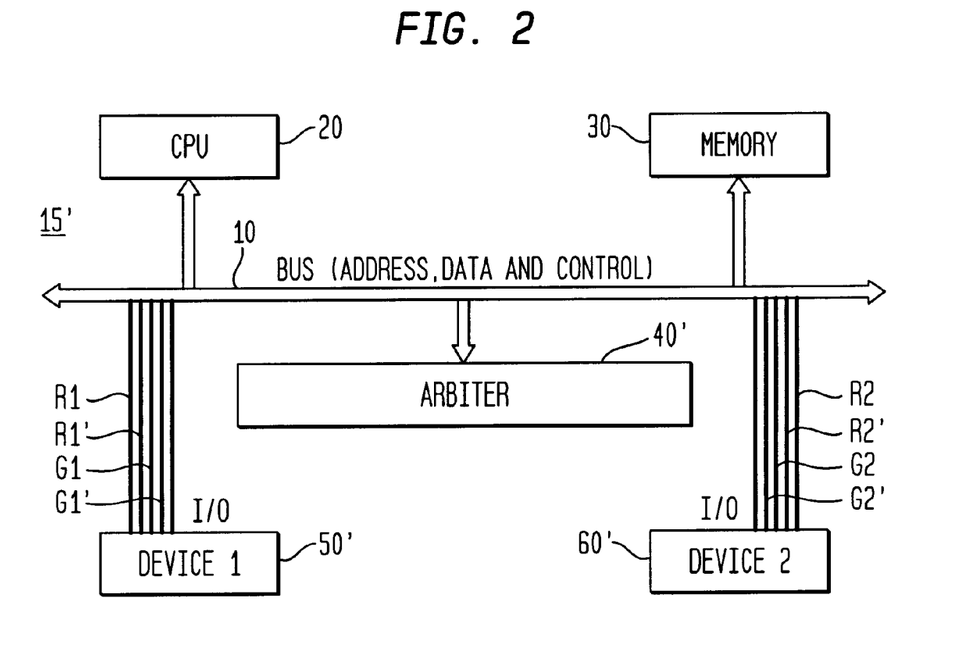
FIG. 2 illustrates the arbiter of the present invention.

FIG. 2 shows a computer system 15' utilizing the arbiter 40' of the present invention. As can be seen, the major differences between prior art system of FIG. 1 and the FIG. 2 system of the present invention is the addition of a separate set of bus request (R1', R2') and grant (G1', G2') lines for each peripheral 50', 60', and the modification of the internal structure of the arbiter 40, now labeled as 40'. Although only two peripherals 50', 60' are shown in FIG. 2, the number of peripherals which can be connected to the arbiter of the present invention is limited only by the capabilities of the computer system.

Additional request lines R1' and R2' are periodic bus request lines, utilized in conjunction with aperiodic lines R1 and R2. Similarly, grant lines G1' and G2' are associated periodic grant lines which are utilized in addition to aperiodic grant lines G1, G2. Although all peripheral devices are equipped with both periodic and aperiodic request and grant lines in the preferred embodiment of the present invention, the periodic lines R1', R2' are used only when the device making the request is a periodic device, otherwise, the aperiodic lines R1, R2 are used. The arbiter 40' utilizes the additional bus request R1', R2' and grant lines G1', G2' to differentiate periodic devices from aperiodic devices. By separating the request and grant lines, the arbiter 40' can effectively handle the special needs of periodic requests. As needed during the operation of the computer system, the different devices 50', 60' request access to the bus 10 by sending request signals, via the bus 10, to the arbiter 40' on request lines R1, R2, R1' and R2'. The arbiter 40' decides, based on the arbitration algorithm, which devices will access the bus at specified times, schedules the access times and sends "grant" signals (on grant lines G1, G2, G1', G2') to the devices 50', 60' that have been granted access to the bus 10.

Figure 3:
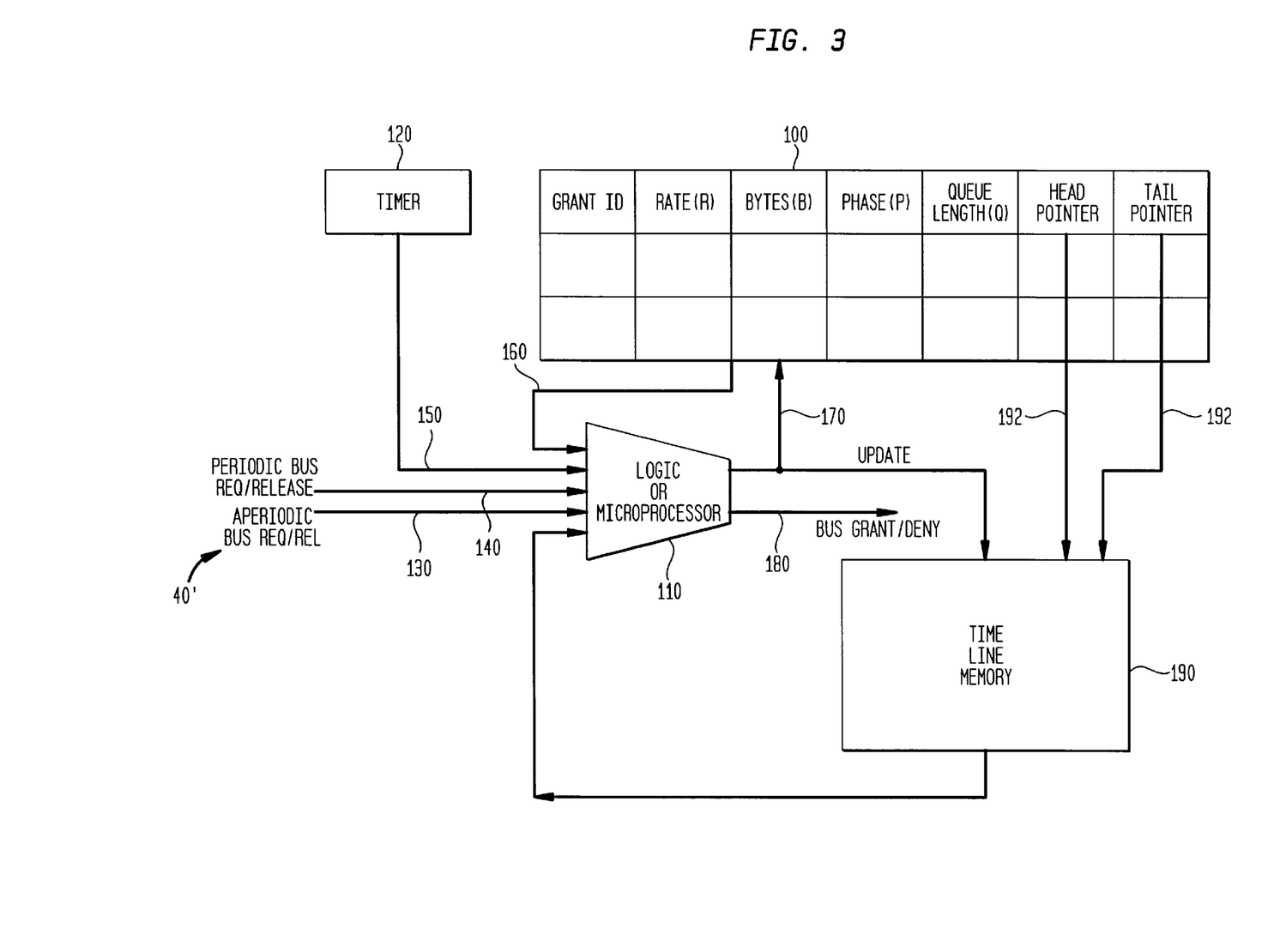
FIG. 3 illustrates the basic structure of the arbiter.

FIG. 3 shows the basic structure of the arbiter 40'. The arbiter 40' includes a service log 100 for storing information relating to pending and issued bus requests. In addition, the arbiter 40' includes a time line memory 190 which contains fixed sized entries of bus service durations required by requesting devices within a period of bus accessing time (e.g., 1 second). As will be described below with reference to FIGS. 5a and 5b, the information stored in the time line memory 190 will include a start of service time and an end of service time for a device (per entry). Various pointers 192 used to access the time line memory 190 are stored in the service log 100.

Both aperiodic and periodic requests and grants are stored in the service log 100. During setup of the peripheral device, and as required thereafter when new devices are installed, the peripherals will send data to the arbiter 40' and the service log 100 over their request lines (e.g., R1, R1'), indicating their service requirements. During startup or installation this information may consist of processing requirements of the device, but thereafter this information consists of requests to use the bus. The data which is stored in the service log 100 during the request procedure will be explained in detail below.

The service log 100 is connected to processor 110 which performs the arbitration of the bus requests. As will be readily understood by those skilled in the art, the processor 110 may be implemented in hardware (e.g., digital logic circuitry), or software (e.g., a program implemented by the processor) or a combination of hardware and software. The processor 110 receives aperiodic and periodic bus request and release signals from the various peripherals over input lines 130 and 140. When a device requires access to the bus, it sends a "request" signal (e.g., a single pulse) on either line 130 or 140 (depending on whether the device is periodic or aperiodic). When the device is finished using the bus, it sends a "release" signal (e.g., two consecutive pulses) on the same line 130, 140 used to send the "request" signal.

The processor 110 also receives data from the service log 100 over input line 160, indicating the service requirements of the device currently requesting access of the bus. In one embodiment of the present invention, as will be described below, the service requirements may include a counter representing the current queue length of the device. The data which is stored in the service log 100 is data sent from the peripheral devices indicating the requirements of the current request. The content of the information stored during and after the request process will be explained in detail below. Finally, the processor 110 receives a clock signal over line 150, from a timer, such as the system clock. The processor 110, based on an associated program or logic pattern (i.e., algorithm), decides, in conjunction with service log 100 and the time line memory 190, which devices will be granted access to the bus and which will be denied. Once a pending request is granted or denied, the service log 100 and time line memory 190 are updated by the processor 110 to store such information over output line 170 (labeled "update"), and the device is notified by a "grant" signal transmitted over output line 180 that it may begin accessing the bus.

Information stored in the service log 100 for each requesting device includes, but is not limited to, number of bytes (B) of data in the transfer, phase (P) of the transfer (relative to a pre-determined time boundary), number of transfers per second, which will be referred to as the rate (R), queue length (Q), tail pointer, head pointer and grant ID.

Since a key feature of the arbiter system of the present invention is to grant access on the system bus in a manner that reduces the queue length of the requesting devices, the arbiter must know the queue length of the requesting devices (or any monotonic function of the queue length). In a first embodiment of the present invention, the arbiter system will estimate the queue lengths of each requesting device. This can be achieved by using the rate (R) and data transfer size (B) information from the service log 100 and by keeping track of the granting and denial of service for that device. Consider, for example, a device 1 (D1) having a transfer size (B) of 3 bytes. If the bus is granted to device D1 at the time the device makes the request (or at an estimate of a request based on rate information), the arbiter does not increment the queue length (Q) of device D1. However, if at the time of the request the bus is not granted, the queue length (Q) of device D1 is incremented by 3 bytes.

Figure 8:
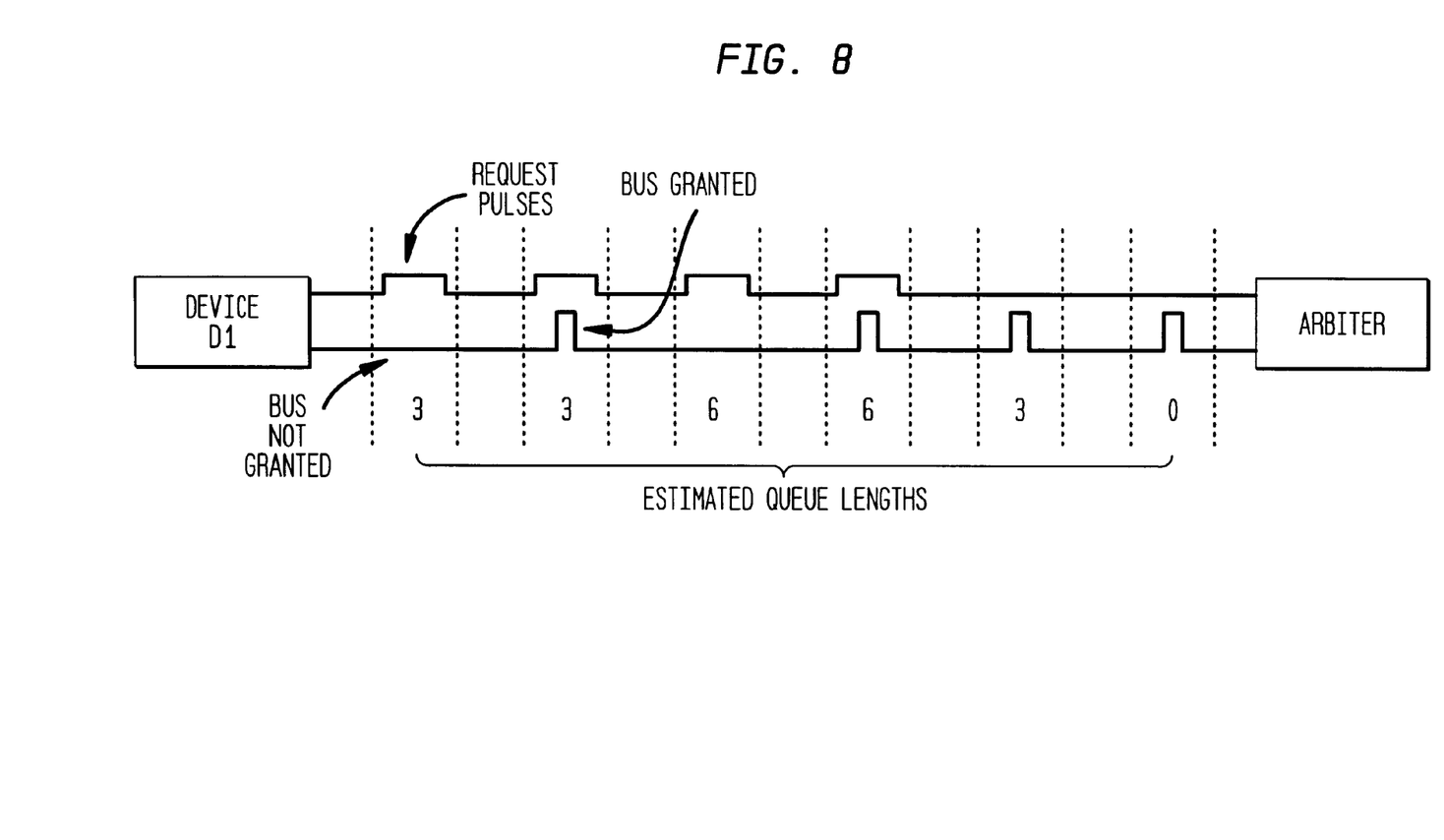
FIG. 8 illustrates an exemplary estimation of a device queue length performed by the arbiter of the present invention.

Another method for estimating the queue length (Q) of a device D1 is to have the device D1 signal the arbiter 40', via the request lines, with an indication of its queue length (Q). The signaling could occur in one of several ways. First, and most desirable, the device D1 could pulse the request line every time new data has been entered into its queue and the arbiter 40' can maintain a counter of the pulses (and thus calculate the queue length (Q) based on the number of bytes (B) information stored in the service log). Note that the device need not be periodic, it can also be semi-periodic. FIG. 8 illustrates an exemplary estimation of a device queue length performed by the arbiter of the present invention. The device D1 having a data transfer size of 3 bytes transmits request pulses to the arbiter (via the bus 10 which is not shown). If the arbiter grants the bus at the time of the request, the estimated queue length for device D1 is not incremented. If, however, the bus is not granted at the time of the request, the estimated queue length is incremented by the data transfer size of 3 bytes. Second, the device D1 could maintain a queue length counter that is transmitted to the arbiter 40'. This is an effective method useful with semi-periodic devices. Another method would be for the devices to include "time stamp" information indicating the time since its last request was processed. This would allow the arbiter 40' to determine whether a device has been delayed for an extremely long period of time. It is stressed that a simplified high-speed architecture of the arbiter 40' can rely solely on the use of the queue length (i.e., no time line memory) and thus, further speeds up the processing. The only state stored in the arbiter 40' is the queue length, so the timer can also be eliminated in this simplified embodiment. In a preferred embodiment of this simplification, a grant will be given to a device with a maximum queue length.

Referring again to FIG. 3, regardless of the method chosen, once the queue length (Q) is determined, the arbiter 40' will grant requests in an effort to reduce the queue lengths of all of the devices and to minimize overall system delays. This is achieved by allocating an appropriate phase (P) and start time for each request. The decisions on phase (P) and start time will be based on device rate (R) for periodic devices, the phases of other devices, bytes (B) and queue length (Q) stored in the service log and time line memory. In a telecommunication switch, this is typically performed based on the device priority. The present invention contemplates the use of several techniques and is not to be limited to a priority scheme. For example, the present invention may allocate bus time (i.e., service) based on the longest queue length (to reduce the longest queue). The invention may also try to maximize bus utilization, minimize the queue length for certain devices, or implement a fairness scheme (where every device gets a relatively equal chance to access the bus) as well as implementing a priority scheme. Moreover, the arbiter 40' can utilize a bus overload control mechanism, where the arbiter 40' can issue a queue reset command to reset the queues of all, some or selected devices.

Figure 4:
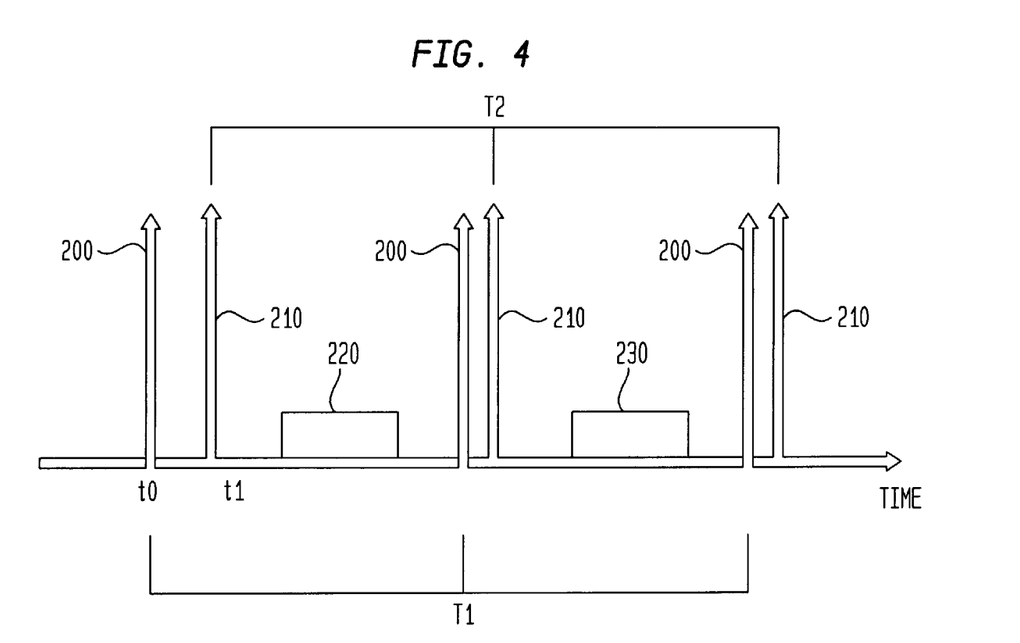
FIG. 4 illustrates a time line showing the positions of periodic and aperiodic requests.

The phase word (P) generally indicates when in time the aperiodic or periodic accessing will begin. The arbiter 40' dynamically sets the phase of the request so that the request fits in the first available timeslot. For instance, consider FIG. 4 where we have two devices which require periodic access which have three requests each (i.e., N=3) and which have the same rate R. The accesses will be scheduled by the arbiter 40' so that the first periodic access 200 (i.e., first to request use of the bus) is started at time to and the second periodic request is started at time $t_1$ (e.g., one nanosecond later), so that both periodic accesses 200, 210 can be run almost simultaneously without interference. In a conventional arbiter, each one of the periodic accesses 200 or 210 would have to make a separate request to use the bus for each one of the three requests. Thus, if the second access in group 200 made its request while aperiodic request 220 was still using the bus, the request would be denied or delayed, or valuable data may be lost. The present invention schedules the bus to minimize such conflict so that delays experienced by devices in group 200 (and in general, all groups) are minimized in the system. As can also be seen from FIG. 4, aperiodic requests 220 and 230 are scheduled at timeslots in-between the periodic accesses 200, 210. In the FIG. 4 example, the periodic requests 200, 210 have the same period, designated as T1 and T2, bet een accesses (i.e., they have the same rate (R)), therefore making it easier to schedule them so that they do not interfere. Often times, however, the period of the periodic accesses is different. By storing the period (rate R) in the service log 100 and using the time line memory 190, the arbiter 40' reduces the probability that the accessing signals will interfere with one another (i.e., attempt to access the bus at the same time).

By utilizing the service log and the time line memory, the present invention can efficiently: (1) decide which device should be granted the bus for any "time step" of the system; (2) allocate bus access for new requests; and (3) de-allocate access once a request has been processed.

Figure 5A:
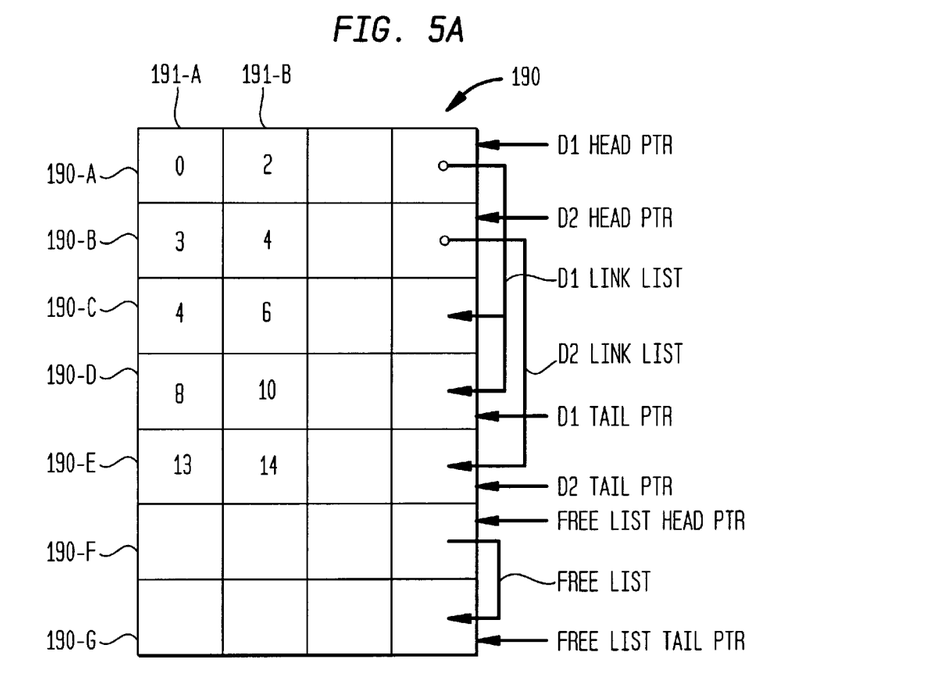
FIG. 5(a) illustrates a linked list implemented by the arbiter of the present invention.
Figure 5B:
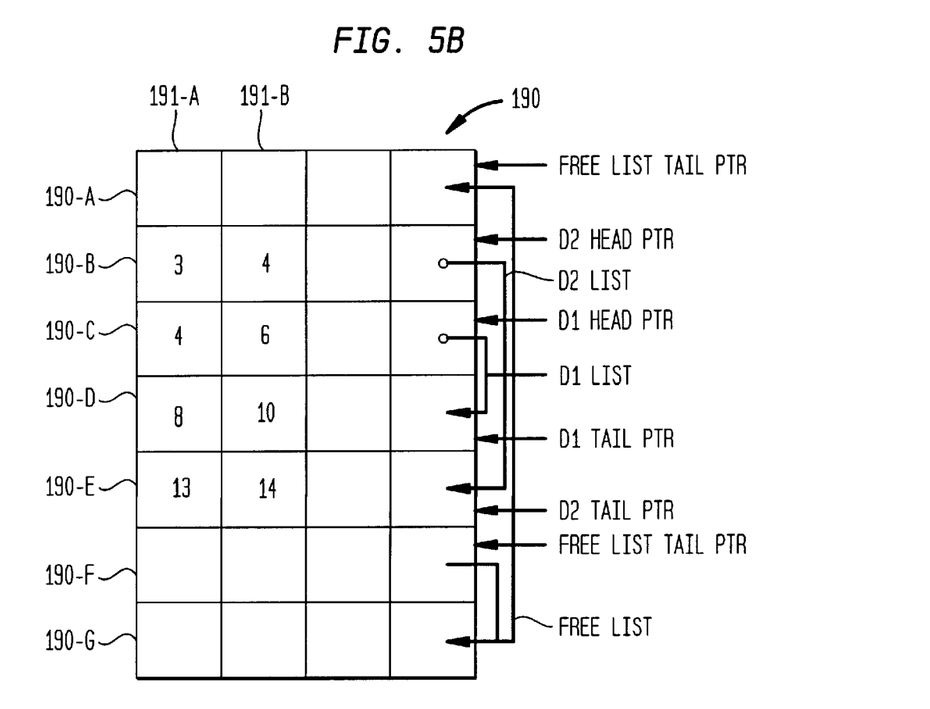
FIG. 5(b) illustrates the linked list of FIG. 5(a) after an entry has been deleted.

Referring to FIGS. 5a an 5b, the utilization of the time line memory 190 is now described. As stated above, the time line memory 190 contains fixed size entries of bus service durations required by requesting devices within a window of bus accessing time (e.g., 1 second). Note that the window moves in time and the time line memory 190 is kept current by periodic updates based on information from the timer 120. As will become apparent, the term "duration" is used to refer to start of service time and stop of service time. Thus, the information stored in the time line memory 190 will include a start of service time and an end of service time for a device (per entry). For illustration purposes only, the time line memory 190 is shown as having a plurality of columns 191-a, 191-b and a plurality of rows 190-a, 190-b, . . . 190-g. It should be appreciated that the time line memory may be organized in any conventional manner, such as by memory address. Illustratively, the first column 191-a indicates start of service time, column 191-b indicates end of service time and each row 190-a, . . . 190-g can store allocation information for a device requesting access on the bus.

For illustration purposes only, it is assumed that there are two devices D1, D2 in the system and that device D1 has a rate of 4 (with respect to the time slot slice used by the arbiter) and a service length of 2 while device D2 has a rate of 10 and a service length of 1. The arbiter of the present invention uses linked lists to organize the devices and to allocate the time line memory 190. Entries in the time line memory 190 that are not allocated to a device are linked together to form a free list. Every linked list will have a head list pointer and a tail list pointer stored in the service log, which is used by the arbiter to allocate bus access time.

FIG. 5a illustrates a device D1 link list comprising rows 190-a, 190-c and 190-d. The D1 head pointer is set to the top of the D1 list, i.e., row 190-a. The D1 tail pointer is set to the bottom of the D1 list, i.e., row 190-d. The device D2 link list comprises rows 190-b and 190-e. The D2 head pointer is set to the top of the D2 list, i.e., row 190-b. The D2 tail pointer is set to the bottom of the D2 list, i.e., row 190-c. The free list contains rows 190-f and 190-g. The free list head pointer is set to the top of the free list, i.e., row 190-f. The free list tail pointer is set to the bottom of the free list, i.e., row 190-g. Future allocations for other periodic or aperiodic devices may also exist in the time line memory 190 (although not shown).

FIG. 5a illustrates two devices D1, D2 with allocated entries in the time line memory 190. A new device would be allocated entries in the time line 190 by chaining down the D1 and D2 linked lists and by forming multiple candidate link lists, each starting at a different phase, for the new device (based on its rate and byte information). The lists are then compared to pre-existing allocations for D1 and D2 to determine conflicts. A candidate link list (one of the phases) for the new device is chosen such that conflicts are minimized. The entries used for the new list come from the free list (whose head and tail pointers are modified to indicate the new head and tail of the list). Phase selection can be done by the conventional "first fit," "best fit" or random methods typically used in memory allocation schemes. If all of the devices have rates that are exact sub-multiples of a basic rate, the allocations can be made without chaining down the link lists, since the entries can be properly calculated based on the rate and phase information. Once the new link list is created, the candidate phase and the head and tail pointers are stored in the service log. A new unique grant ID is assigned to this device and stored in the service log 100 and its queue length (Q) is set to zero.

FIG. 5b illustrates the time line memory 190 after one of the bus access service entries (row 190-a) has been completed (i.e., granted and the bus access service duration has completed). As shown, the device D1 link list now comprises rows 190-c and 190-d. The D1 head pointer is set to the new top of the D1 list, i.e., row 190-c. The D1 tail pointer remains set at the bottom of the D1 list, i.e., row 190-d. The device D2 link list comprises rows 190-b and 190-e. The D2 head pointer remains set at the top of the D2 list, i.e., row 190-b. The D2 tail pointer remains set at the bottom of the D2 list, i.e., row 190-e. The free list, however, now contains rows 190-f, 190-g and 190-a. The free list head pointer remains set at the top of the free list, i.e., row 190-f. The free list tail pointer, however, is now set to the new bottom of the free list, i.e., row 190-*a*. It should be appreciated that any conventional link list method, including reverse and double linked list techniques, could be used to maintain the time line memory 190.

Bus grants are performed by looking at all of the devices in the service log, accessing the respective time line link list and finding the next grant (i.e., earliest grant in time in the time line memory 190 or alternatively, grants for a device that has a maximum queue length). When the time comes for that service entry, the bus is granted to the device. Once the bus access is complete, the allocated bus access entry is removed from the time line memory (and the device's link list) and also from the service log if all allocations for the same device have been removed. There are various variants of grants. For example, each time a device is granted the bus, the arbiter issue a grant signal. Alternatively, the arbiter can issue a "multi-grant" by issuing a grant signal indicating that the bus has been granted for the next x requests (thus alleviating the need for the device to make requests, since it has already been given x number of grants).

Preferably, the arbiter distinguishes between periodic request that have periods that are sub-multiples of a basic rate (as described above) and periodic requests with periods that are not sub-multiples of the basic rate. When processing periodic requests having periods that are sub-multiples of the basic rate, the arbiter does not have to chain down the time line memory to determine future bus allocations since it is known that the request can be given indefinite service without a conflict. However, when servicing periodic requests having periods that are not sub-multiples of the basic rate, the arbiter must use the time line memory to avoid conflicts since the "non-basic-rate" period cannot be given indefinite service. The basic rate is system dependent and may change accordingly.

Since most peripherals on the market today are not equipped to provide periodic request signals or accept periodic grant signals, the inventor has developed alternate embodiments for implementing the present invention.

Figure 6:
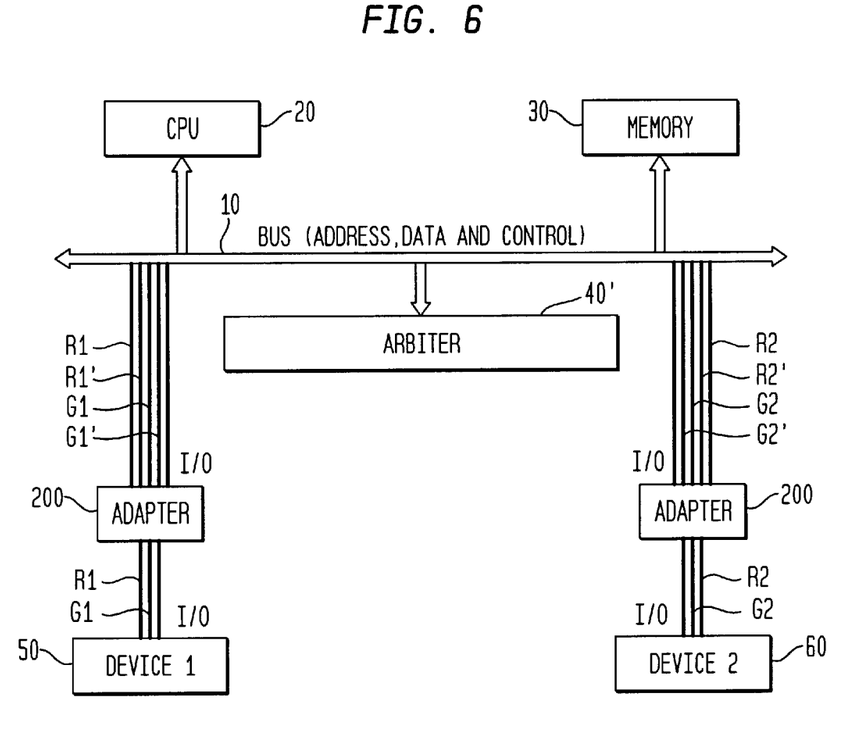
FIG. 6 illustrates a first alternate embodiment of the present invention.

One alternative shown in FIG. 6 would be to use an adapter 200, connected between the peripheral devices 50, 60 (i.e., device which do not include periodic request or grant lines) and the bus 10, Which recognizes periodic requests from the devices 50, 60 and provides appropriate periodic request signals to the arbiter 40' (via the bus 10). The adapter 200 would accept signals from, for example the device 50, on the aperiodic request line which is already part of the device. The adapter 200 would determine based on the attributes of the signal whether the device 50 was requesting periodic or aperiodic access. If the device is granted control of the bus by the arbiter 40', the adapter 200 would then provide a grant signal from the arbiter 40' to the device 50 on the device aperiodic grant line. Since the arbiter 40' controls processing of all requests whether they be aperiodic or periodic, the grant signal merely needs to identify that the bus is ready to receive information. Put differently, there is only one grant signal for both aperiodic or periodic requests. The inner workings of the arbiter 40' are the same as described above with reference to the preferred embodiment of the present invention.

Figure 7:
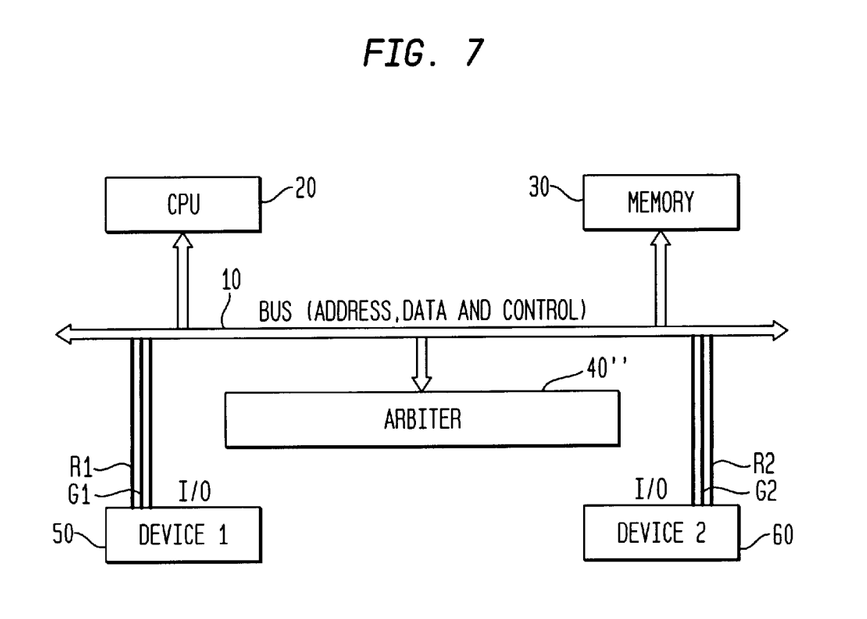
FIG. 7 illustrates a second alternate embodiment of the present invention.

Another alternative embodiment includes the adapter 200 within a modified arbiter 40", as shown in FIG. 7, so that extra hardware is not required. Additionally, the devices 50, 60 can be modified so that the periodic request signals can be multiplexed on the normal (i.e., aperiodic) request lines of the device, along with the aperiodic request signals, so that no extra lines are required. Of course this method involves altering the inside of the peripheral by adding a multiplexer.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A bus arbitration system comprising:
    a processor which accepts periodic and aperiodic bus request signals;
    a time line memory connected to said processor for storing information representing bus service duration;
    at least one peripheral device connected to said processor for sending bus request signals to said processor, said processor dynamically allocating timeslots for a bus service duration on said bus for said peripheral device based on said periodic and aperiodic request signals by issuing a grant signal to said at least one peripheral device; and
    a service log memory connected to said processor for storing information related to said periodic and aperiodic bus request signals and said associated grant signals.

2. The bus arbitration system of claim 1, wherein said service log also stores information concerning performance metric information of said at least one peripheral device and said processor allocates timeslots based on said performance metric information.

3. The bus arbitration system of claim 2, wherein said performance metric information is queue length.

4. The bus arbitration system of claim 2, wherein said service log also stores information about the number of bytes of data associated with each request and information about the period of requests for periodic requests.

5. The bus arbitration system of claim 2, wherein the processor updates the service log once a request has been granted to indicate that the request has been granted.

6. The bus arbitration system of claim 5, wherein the update of the service log comprises indicating that a timeslot has been allocated for the granted request.

7. The bus arbitration system of claim 1, wherein the said at least one peripheral device sends a periodic bus request signal to the processor when the peripheral device is a periodic device.

8. The bus arbitration system of claim 1, wherein the said at least one peripheral device sends a aperiodic bus request signal to the processor when the peripheral device is an aperiodic device.

9. The bus arbitration system of claim 1, wherein the processor differentiates between periodic and aperiodic request signals, so that when an aperiodic request is made the processor allocates a timeslot to the at least one device, and when a periodic request is made the processor grants a set of timeslots to the at least one device.

10. The bus arbitration system of claim 2, wherein the processor utilizes the information stored in the service log memory to dynamically allocate at least one timeslot on the bus to the said at least one device.

11. The bus arbitration system of claim 10, wherein when the request is a periodic request, the processor dynamically allocates at least one set of timeslots to the said at least one device.

12. The bus arbitration system of claim 11, wherein when the at least one timeslot is allocated, the processor creates an entry in the service log indicating that the at least one timeslot has been allocated.

13. The bus arbitration system of claim 12, wherein when the at least one set of timeslots are allocated, the processor creates an entry in the service log indicating that the at least one set of timeslots have been allocated.

14. The bus arbitration system of claim 1, wherein the processor is implemented in digital logic circuitry.

15. The bus arbitration system of claim 1, wherein the processor is implemented in software.

16. The bus arbitration system of claim 1, wherein the processor uses said time line memory to grant multiple periodic timeslots to a peripheral device sending a periodic request signal.

17. The bus arbitration system of claim 1, wherein the service log includes a section of memory comprising a linked list for storing information in entries relating to the order of granted requests.

18. The bus arbitration system of claim 17, wherein the arbitration system deletes granted request entries from the linked list as soon as the peripheral device associated with granted request has completed its use of the bus.

19. The bus arbitration system of claim 18, wherein the processor assigns new requests to entries in the linked list where entries had been previously deleted.

20. The bus arbitration system of claim 2, wherein said processor estimates said performance metric based on a signal from said at least one peripheral device.

21. The bus arbitration system of claim 20, wherein the at least one peripheral device sends a signal to the processor when it has placed information in a queue.

22. The bus arbitration system of claim 20, wherein the at least one peripheral device sends a queue length to said processor.

23. The bus arbitration system of claim 2, wherein said processor uses an ordinal representation of said performance metric information to estimate and store said performance metric.

24. The bus arbitration system of claim 17, wherein when a new request is transmitted to the processor, the processor prepares an additional linked list for the new request.

25. The bus arbitration system of claim 24, wherein the processor compares the linked list to determine if there are any conflicts prior to allocating timeslots for the new request.

26. The bus arbitration system of claim 2, wherein said processor estimates said performance metric based on a rate of the device and a data transfer size for the device.

27. A data processing system comprising:
a data bus;
at least one peripheral device connectable to said data bus; and,
an arbitration system connected to said peripheral device, said arbitration system comprising:
a processor which accepts periodic and aperiodic bus request signals and which dynamically allocates timeslots on a bus based on said periodic and aperiodic request signals by issuing a grant signal to the at least one peripheral device;
a time line memory connected to said processor for storing information representing bus service duration;
a service log connected to said processor for storing information related to said periodic and aperiodic bus request signals and said grant signals.

28. The data processing system of claim 27, wherein said service log also stores information concerning performance metric information of said at least one peripheral device and said processor allocates timeslots based on said performance metric information.

29. The data processing system of claim 28, wherein said performance metric information is queue length.

30. The data processing system of claim 27, wherein said service log also stores information about the number of bytes of data associated with each request and information about the period of requests for periodic requests.

31. The data processing system of claim 27, wherein the processor updates the service log once a request has been granted to indicate that the request has been granted.

32. The data processing system of claim 31, wherein the update of the service log comprises indicating that a timeslot has been allocated for the granted request.

33. The data processing system of claim 27, wherein the said at least one peripheral device sends a periodic bus request signal to the processor when the peripheral device is a periodic device.

34. The data processing system of claim 27, wherein the said at least one peripheral device sends a aperiodic bus request signal to the processor when the peripheral device is an aperiodic device.

35. The data processing system of claim 27, wherein the processor differentiates between periodic and aperiodic request signals, so that when an aperiodic request is made the processor allocates a timeslot to the at least one device, and when a periodic request is made the processor grants a set of timeslots to the at least one device.

36. The data processing system of claim 29, wherein the processor utilizes the information stored in the service log to dynamically allocate at least one timeslot on the bus to the said at least one device.

37. The data processing system of claim 36, wherein when the request is a periodic request, the processor dynamically allocates at least one set of timeslots to the said at least one device.

38. The data processing system of claim 36, wherein when the at least one timeslot is allocated, the processor creates an entry in the service log indicating that the at least one timeslot has been allocated.

39. The data processing system of claim 38, wherein when the at least one set of timeslots are allocated, the processor creates an entry in the service log indicating that the at least one set of timeslots have been allocated.

40. The data processing system of claim 27, wherein the processor is implemented in digital logic circuitry.

41. The data processing system of claim 27, wherein the processor is implemented in software.

42. The data processing system of claim 27, wherein the processor uses said time line to grant multiple periodic timeslots to a peripheral device sending a periodic request signal.

43. The data processing system of claim 27, wherein the service log includes a section of memory comprising a linked list for storing information in entries relating to the order of granted requests.

44. The data processing system of claim 43, wherein the arbitration system deletes granted request entries from the linked list as soon as the peripheral device associated with granted request has completed its use of the bus.

45. The data processing system of claim 44, wherein the processor assigns new requests to entries in the linked list where entries had been previously deleted.

46. The data processing system of claim 27, wherein when an aperiodic or periodic request is granted, the at least one peripheral device begins accessing the bus.

47. The data processing system of claim 46, wherein the at least one peripheral device sends a release signal to the processor when it has completed its use of the bus.

48. The data processing system of claim 27, wherein an aperiodic or periodic request is denied, the processor sends a deny signal to the at least one peripheral device.

49. The data processing system of claim 28, wherein said processor estimates said performance metric of based on a signal from said at least one peripheral device.

50. The data processing system of claim 49, wherein the at least one peripheral device sends a signal to the processor when it has placed information in a queue.

51. The data processing system of claim 49, wherein the at least one peripheral device sends a queue length to said processor.

52. The data processing system of claim 28, wherein said processor uses an ordinal representation of said performance metric information to estimate and store said performance metric information.

53. The data processing system of claim 28, wherein said processor estimates said performance metric based on a rate of the device and a data transfer size for the device.

54. A data processing system comprising:

a data bus; and an arbitration system connected to said bus, said arbitration system comprising:

a processor which accepts periodic and aperiodic bus request signals and which dynamically allocates timeslots on said bus based on said periodic and aperiodic request signals by issuing a grant signal to at least one peripheral device connected to said bus;

a service log connected to said processor for storing information related to said periodic and aperiodic bus request signals and said grant signals, said service log also stores information concerning performance metric information of said at least one peripheral device and said processor allocates timeslots based on said performance metric information.

55. A data processing system comprising:

a data bus; and an arbitration system connected to said bus, said arbitration system comprising:

a processor which accepts periodic and aperiodic bus request signals from said bus and which dynamically allocates timeslots on said bus based on said periodic and aperiodic request signals by issuing a grant signal to at least one peripheral device connected to said bus;

a service log connected to said processor for storing information related to said periodic and aperiodic bus request signals and said grant signals, said service log also stores information concerning performance metric information of said at least one peripheral device connected to said bus and said processor allocates timeslots based on said performance metric information.

56. A method for allocating time on a data bus comprising the steps of:

determining if a pending request signal to use the data bus is a periodic or aperiodic request signal;

dynamically allocating a timeslot for accessing the data bus based on the determination of the pending request signal;

issuing a grant signal when the pending request signal to use the data bus is allocated to a particular timeslot; and storing information related to pending periodic and aperiodic request signals, the grant signals, and the timeslots in a memory.

57. The method of claim 56, comprising the further step of:

issuing a release signal to a processor indicating that a device which has been granted use of the data bus has finished accessing the bus;

deleting the information in the memory associated with said completed access;

wherein once the information has been deleted the access time on the bus occupied by the device is dynamically reallocated to another device which is making a request to use the data bus.

58. The method of claim 57, wherein the information related to the granted request which is stored in the memory is information relating to the data length and time period between accesses of the granted request.

59. The method of claim 56 wherein a time line is used to grant future timeslots when a request is a periodic.

60. The method of claim 56 further comprising:

determining whether other future timeslots satisfy the pending request signal;

if other future timeslots satisfy the pending request signal, dynamically allocating a future timeslot for accessing the data bus based on the determination that pending request signal is a periodic signal; and issuing a grant signal containing all allocated timeslots.

61. The method of claim 56 wherein timeslots are dynamically allocated based on a performance metric of a device issuing a request.

62. The method of claim 61 wherein the performance metric is a queue length of the device.

63. The method of claim 61 wherein the performance metric is estimated based on a signal from the device.

64. The method of claim 63 wherein the signal represents that new data has been placed in the queue of the device.

65. The method of claim 61 wherein the performance metric is estimated based on a rate of the device and a data transfer size for the device.

* * * * *